United States Patent [19]
Suzaki et al.

[11] Patent Number: 5,325,225
[45] Date of Patent: Jun. 28, 1994

[54] METHOD OF OPTICAL TRANSMISSION AND OPTICAL TRANSMITTER USED IN THE SAME

[75] Inventors: Tetsuyuki Suzaki; Naoya Henmi, both of Tokyo, Japan

[73] Assignee: NEC Corporation, Tokyo, Japan

[21] Appl. No.: 851

[22] Filed: Jan. 6, 1993

Related U.S. Application Data

[63] Continuation of Ser. No. 620,113, Nov. 30, 1990, abandoned.

[30] Foreign Application Priority Data

Nov. 30, 1989 [JP] Japan ................. 1-310927

[51] Int. Cl.$^5$ ............................. H04B 10/04
[52] U.S. Cl. ..................... 359/187; 359/180; 359/183; 372/26; 372/29; 385/3
[58] Field of Search ............. 359/124, 180, 181, 182, 359/183, 187, 188; 372/26, 28, 29, 31, 32; 385/2, 8, 3

[56] References Cited

U.S. PATENT DOCUMENTS

| | | | |
|---|---|---|---|
| 4,525,687 | 6/1985 | Chemla et al. | 372/43 |
| 4,660,206 | 4/1987 | Halmos et al. | 372/28 |
| 4,669,086 | 5/1987 | Kaede et al. | 372/32 |
| 4,744,616 | 4/1988 | Robinson et al. | 385/2 |
| 4,805,235 | 2/1989 | Henmi | 359/182 |
| 4,835,780 | 5/1989 | Sugimura et al. | 372/29 |
| 4,837,526 | 6/1989 | Suzuki et al. | 385/8 |
| 4,888,777 | 12/1989 | Takeyama | 372/29 |
| 4,912,526 | 3/1990 | Iwaoka et al. | 359/124 |
| 4,912,716 | 2/1990 | Mead | 372/38 |
| 4,913,506 | 5/1990 | Suzuki | 385/2 |
| 4,958,359 | 9/1990 | Urakami et al. | 372/31 |
| 5,073,331 | 12/1991 | Shirasaki | 372/26 |
| 5,128,950 | 7/1992 | Tsuchiga et al. | 359/180 |
| 5,170,274 | 12/1992 | Kuwata et al. | 359/183 |

Primary Examiner—Richard E. Chilcot, Jr.
Assistant Examiner—Rafael Bacares
Attorney, Agent, or Firm—Sughrue, Mion, Zinn, Macpeak & Seas

[57] ABSTRACT

A method of optical transmission comprises steps of generating a light signal, controlling a wavelength of the light signal in accordance with a correcting signal, and modulating an intensity of the light signal supplied from the light source to generate an output light signal in accordance with a modulating signal. The wavelength change of the light signal generated by the light source coincides with the wavelength change which occurs during the modulating step, so that the wavelength change is cancelled in the output light signal. An optical transmitter used in the method comprises a light source which generates a light signal, a correcting signal generating circuit which supplies the light source with a correcting signal for changing the wavelength of the light signal generated by the light source, and an optical modulator which modulates an intensity of the light signal supplied from the light source to generate an output light signal in accordance with a modulating signal.

17 Claims, 5 Drawing Sheets

METHOD OF OPTICAL TRANSMISSION AND OPTICAL TRANSMITTER USED IN THE SAME

This is a continuation of Ser. No. 08/620,113 filed Nov. 30, 1990 now abandoned.

FIELD OF THE INVENTION

This invention relates to a method of optical transmission and an optical transmitter used in the same, and more particularly to, a method of optical transmission used in a digital optical communication using an optical fiber, and an optical transmitter used in the same.

BACKGROUND OF THE INVENTION

In an optical communication in which information is transferred by a light signal through an optical fiber, the dispersion of the wavelength of the light signal occurs during the transmission. The dispersion of the wavelength causes waveform degradation of the light signal, so that faulty information may be transferred. As a result, a transmission distance in which correct information is transferred is limited by the wavelength dispersion. Therefore, it is necessary to narrow the wavelength spectrum of the light signal to lengthen the transmission distance. In order to obtain a light signal having a narrow wavelength spectrum, the external modulation method, in which a light signal emitted from a semiconductor laser is modulated by an optical modulator, is applied.

A conventional optical modulator has been described on page 4-193 of "Part 4, Spring term National Conference Record, 1989. The Institute of Electronics, Information and Communication Engineers of Japan", titled as "High performance optical intensity modulator monolithically integrated with a DFB laser".

The conventional optical modulator is an electroabsorption type optical modulator which is monolithically integrated with a semiconductor laser.

The optical modulator and the semiconductor laser are fabricated on a common substrate having a common electrode on a first surface thereof. The optical modulator comprises a light absorption layer among epitaxial layers grown on a second surface of the substrate, and a modulator electrode provided on a cap layer which is a top layer in the epitaxial layers, and the semiconductor laser comprises an active layer among epitaxial layers grown on the second surface of the substrate, and a laser electrode provided on a cap layer in the epitaxial layers, such that the absorptionlayer and the active layer are coupled by a butt-joint, and opposite facets of the optical modulator and the semiconductor laser are coated with anti-reflection layers.

In operation, the semiconductor laser emits a laser light having a uniform optical intensity and a uniform oscillation wavelength. Then, the optical modulator modulates the intensity of the light signal supplied by the semiconductor layer by changing the absorption coefficient of the optical modulator. By using the optical modulator, the dispersion of the wavelength spectrum of the light signal becomes one fifth of that in a former method in which a semiconductor laser emits a light signal modulated in intensity. Therefore, the transmission distance which is limited by the dispersion of the wavelength spectrum becomes five times as long as that in the former method.

In the conventional optical modulator, however, there is a disadvantage in that extension of the wavelength spectrum of the light signal still occurs due to a minute phase modulation generated during the intensity modulation by the optical modulator.

SUMMARY OF THE INVENTION

Accordingly, it is an object of the invention to provide a method of optical transmission and an optical transmitter used in the same, in which a transmission distance in which correct information is transferred is significantly long.

According to a first feature of the invention, a method of optical transmission comprises the steps of:

generating a light by a light source;

changing the wavelength of the light in accordance with a correcting signal; and modulating the strength of the light supplied from the light source to generate an output light signal in accordance with a modulating signal;

wherein the wavelength change of the light generated by the light source coincides with the wavelength change which occurs during the modulating step so that the wavelength change is cancelled in the output light signal.

According to a second feature of the invention, an optical transmitter, comprises:

a light source which generates a light having a predetermined wavelength;

means for changing the wavelength of the light generated by the light source in accordance with a correcting signal; and an optical modulator which modulates the strength of the light supplied from the light source to generate an output light signal in accordance with a modulating signal.

BRIEF DESCRIPTION OF THE DRAWINGS

The invention will be described in more detail in conjunction with appended drawings, wherein.

DESCRIPTION OF THE PREFERRED EMBODIMENTS

Before describing a method of optical transmission and an optical transmitter used in the method according to the invention, the conventional optical modulator briefly described before will be explained in conjunction with FIG. 1.

Figure 1:
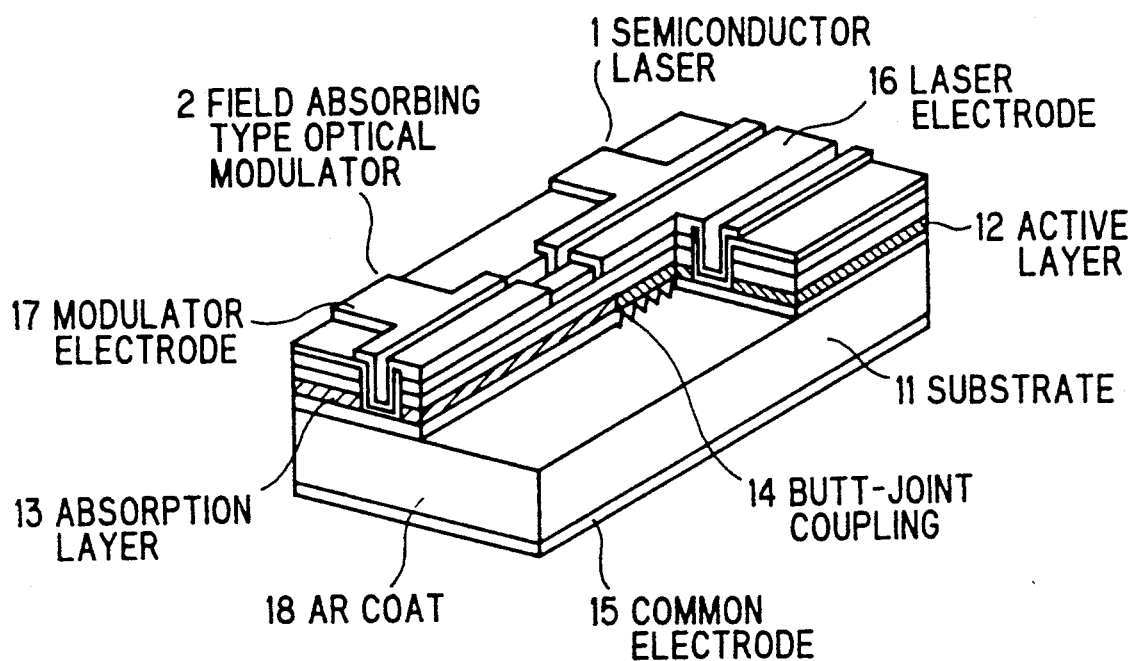
FIG. 1 is a perspective view illustrating a conventional optical modulator.

FIG. 1 shows the conventional optical modulator. The conventional optical modulator comprises a electroabsorption type optical modulator 2 which is monolithically integrated with a semiconductor laser 1. The semiconductor laser 1 and the optical modulator 2 are fabricated on a common semiconductor substrate 11 which is provided with a common electrode 15 on a first surface thereof. The semiconductor laser 1 comprises epitaxial layers including an active layer 12 grown on a second surface of the substrate 11, and a laser electrode 16 provided on a cap layer which is a top layer in the epitaxial layer. In a similar structure, the optical modulator 2 comprises epitaxial layers including a light absorption layer 13 grown on the second surface of the substrate 11, and a modulator electrode 17 provided on a cap layer in the epitaxial layers. The active layer 12 and the absorption layer 13 are coupled to provide an optical coupling therebetween by a butt-joint 14, and opposite facets of the semiconductor laser 1 and the optical modulator 2 are coated with anti-reflection (AR) layers 18.

In portion, a predetermined current is applied across the layer and common electrodes 16 and 15 to provide light emitted from the active layer 12, and the light is absorbed in the absorbing layer 13 in accordance with an absorption efficient changing dependent on a voltage applied across the modulator electrode 17 and the common electrode 15. Thus, an intensity modulation light is obtained from the optical modulator 2.

Next, an optical transmitter in a first preferred embodiment according to the invention will be explained in FIG. 2.

The optical transmitter comprises a semiconductor laser 1 which generates a laser light signal in accordance with a direct bias current Ib, electroabsorption type optical modulator 2 which modulates an intensity of the light signal supplied from the semiconductor laser 1 in accordance with a modulating signal Im, a delay circuit 5 which supplies the optical modulator 2 with a delayed signal of the modulating signal Im, and a differentiating circuit 3 which supplies the semiconductor layer 1 with a differentiated signal of the modulating signal Im.

In operation, the current Ib is supplied to the semiconductor laser 1 to generate a laser light having uniform intensity and wavelength. On the other hand, the delayed signal of the modulating signal Im is supplied to the optical modulator 2, where the intensity of the light supplied from the semiconductor laser 1 is modulated dependent on an electric field to change an optical absorption coefficient of the optical modulator 2 in accordance with the modulating signal Im.

In this state, an output light signal Pout which is supplied from the optical modulator 2 will be an intensity modulation signal having an expanded wavelength spectrum because of the wavelength shift caused by a phase modulation, if the differentiating circuit 3 is not provided. In order to cancel the wavelength shift, the differentiated signal of the modulating signal Im is supplied from the differentiating circuit 3 to the semiconductor laser 1 as well as the current Ib. In this case, the light signal generated by the semiconductor laser 1 has a wavelength change corresponding to the wavelength shift which occurs in the optical modulator 2, so that the wavelength shift int eh optical modulator 2 is cancelled when the light signal is supplied to the optical modulator 2. As a result, the output light signal Pout has an uniform wavelength. The extension of the wavelength spectrum of the output light signal Pout can be minimized by adjusting a balance between a time in which the modulating signal Im reaches the optical modulator 2 and a time in which the differentiated signal of the modulating signal Im reaches the semiconductor laser 1.

In an optical transmission experiment using the optical transmitter int eh first preferred embodiment which is carrie dot under a condition that a wavelength of a light signal is 1.5 μm and a transmission velocity is 4.8 Gb/s, it is confirmed that the extension of the wavelength spectrum of the modulated light signal becomes 0.03Å, which is approximately one fifth as narrow as that in the conventional method or apparatus, so that an allowable dispersion of the light signal during transmission through a n optical fiber becomes 2500 ps/nm, which is five times as wide as that in the conventional method. As a result, an optical transmission in a distance of 120 km using an optical fiber having a characteristic of the wavelength dispersion which is 17 ps/n·km at a wavelength of 1.55 μm is carried out without any fault of transferred information codes.

Figure 3:
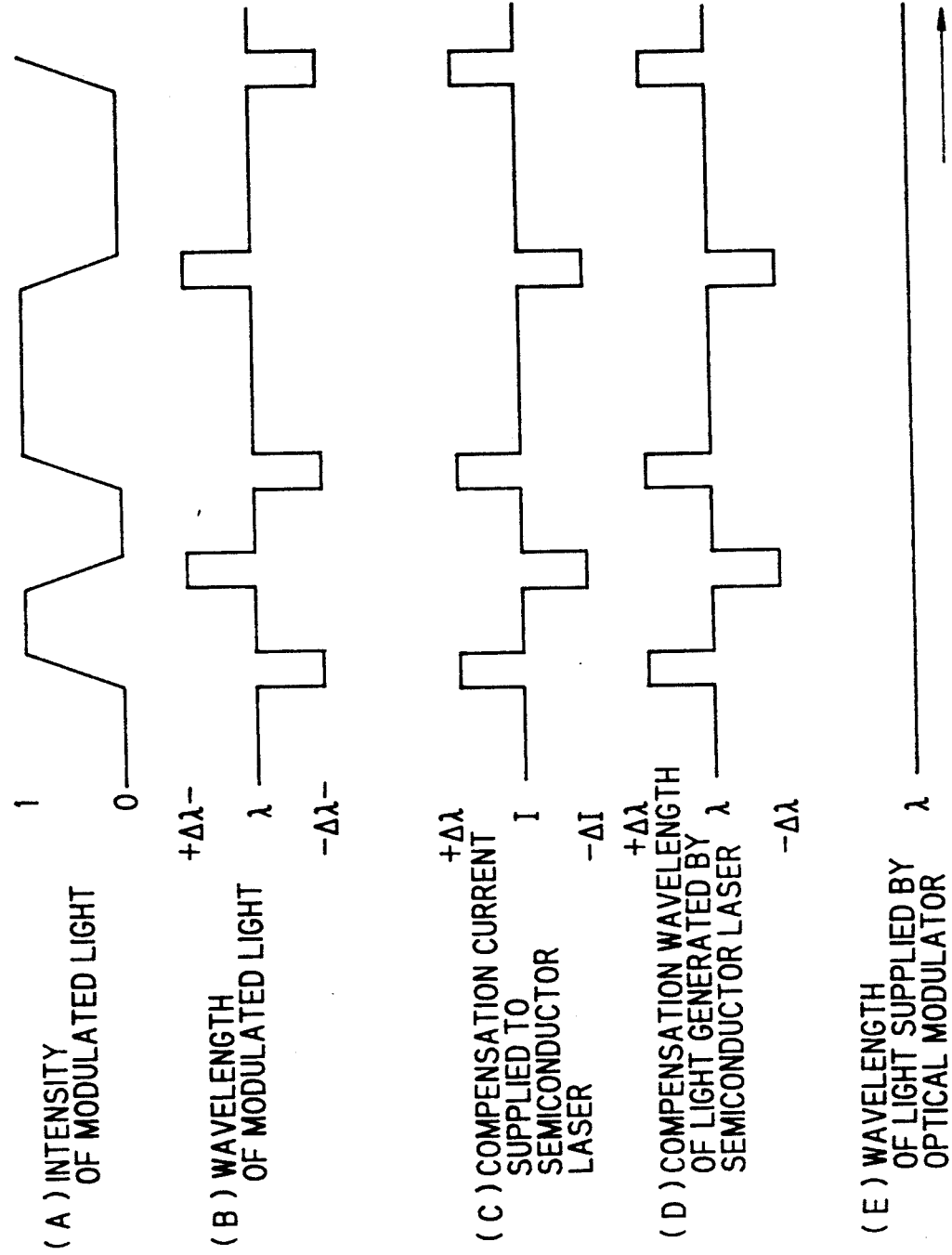
FIG. 3 is a timing chart of operation in the first preferred embodiment according to the invention.

FIG. 3 is a timing chart of operation in the first preferred embodiment according to the invention.

In FIG. 3, the light generated by the semiconductor laser 1 is modulated in intensity by the optical modulator 2 to provide the output light signal Pout as an intensity modulation light signal having a waveform as shown in (A). The wavelength of the intensity modulation light signal Pout changes between $+\Delta\lambda$ and $-\Delta\lambda$ as shown in (B). In order to cancel this wavelength change, a current I added tot he bias current Ib which is supplied to the semiconductor laser 1 is changed as shown in (C) to compensate the change in the wavelength of the light signal Pout as shown in (D). As a result, the light signal Pout supplied from the optical modulator 2 has a uniform wavelength as shown in (E).

In this case, the wavelength change shown in (B) is proportional to a differentiated value of the intensity of the modulated light signal shown in (A). Therefore, it is able to cancel the wavelength change caused in the optical modulator 2, wherein the wavelength of the light signal generated by the semiconductor laser 1 is changed by the compensation signal which is differentiated signal of the modulating signal Im supplied to the optical modulator 2. Consequently, the dispersion of the wavelength spectrum of the intensity modulation light signal supplied by the optical modulator 2 is limited significantly.

Figure 4:
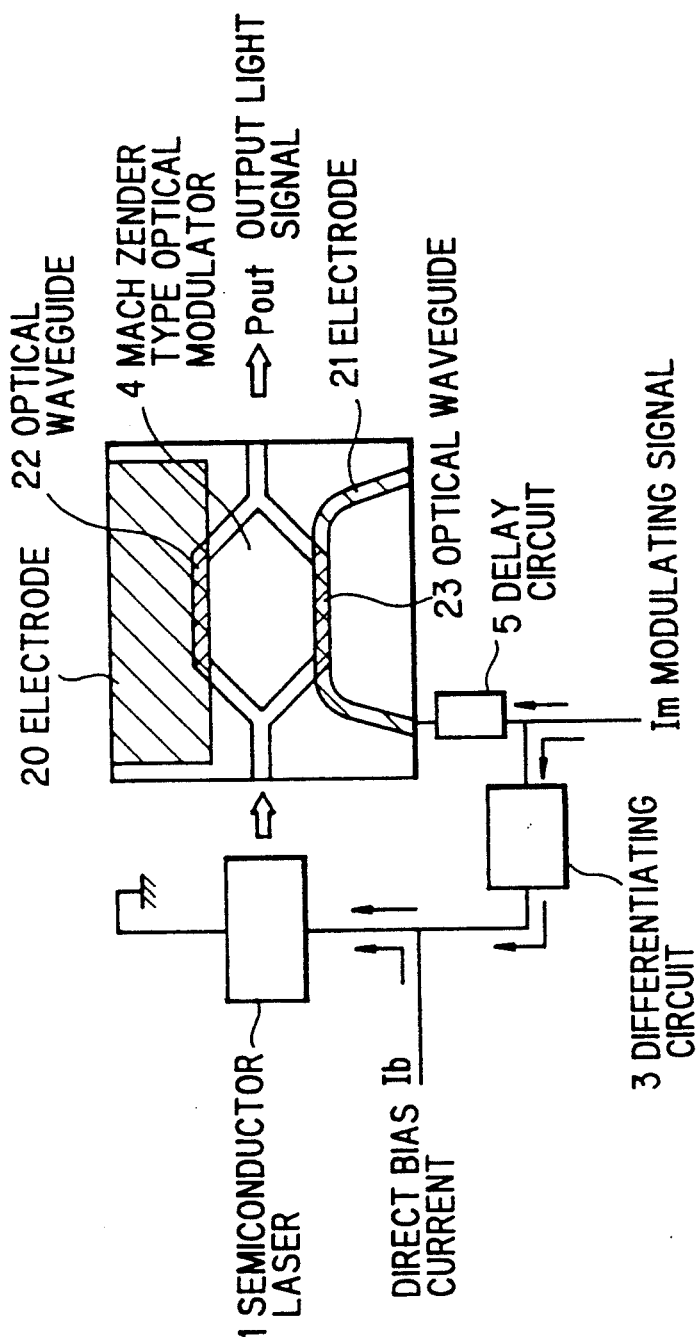
FIG. 4 is a block diagram of an optical transmitter in a second preferred embodiment according to the invention.

FIG. 4 is a block diagram of an optical transmitter in a second preferred embodiment according to the invention.

Figure 2:
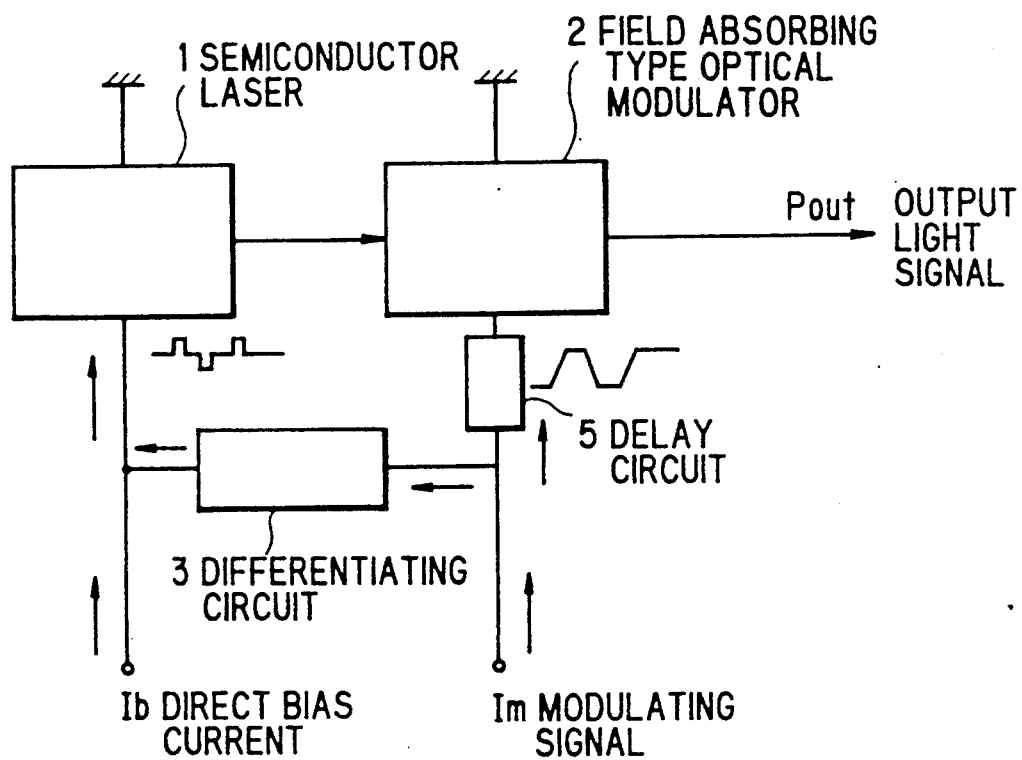
FIG. 2 is a block diagram of an optical transmitter in a first preferred embodiment according to the invention.

A structure of the optical transmitter is the same as that in FIG. 2, except that the electroabsorption optical modulator 2 is replaced by a Mach-Zender type optical modulator 4. The Mach-Zender type optical modulator 4 comprises two electrodes 20 and 21, and two optical waveguides 22 and 23. In the optical modulator 4, the intensity of the light signal which transmits through the optical waveguides 22 and 23 is modulated by applying and electric field across the electrodes 20 and 21 to change optical path length of the optical waveguides 22 and 23. The operation of the optical transmitter is the same as that in FIG. 2. That is, a modulating signal Im is divided into first and second modulating signals. The first modulating signal is supplied through the delay circuit 5 to the electrode 21 of the Mach-Zender type modulator 4, and the second modulating signal is differentiated in the differentiating circuit 3 to be supplied t the semiconductor laser light source 1. In the Mach-Zender type modulator 4, a wavelength shift occurs in accordance with a difference between electric fields applied across the optical waveguides 22 and 23. The polarity of the differentiating circuit 3, a delay time of the delay circuit 5, etc. are adjusted, sot hat a wavelength shift generated in the Mach Zender modulator 4 is cancelled to minimize the extension of the wavelength spectrum of the light output Pout.

In an optical transmission experiment using the optical transmitter int eh second preferred embodiment which is carried out under a condition that a wavelength of a light signal is 1.5 μm and a transmitting velocity is 4.8 Gb/s, it is confirmed that the extension of the wavelength spectrum of the modulated light signal become 0.005 nm, which is half as narrow as that in the conventional method or apparatus, so that an allowable dispersion of the light signal during transmission by an optical fiber becomes 5000 ps/nm, which is approximately twice as wide as that in the conventional method. As a result, an optical transmission in a distance of 250 km using an optical fiber having a characteristic of the wavelength dispersion which is 20 ps/nm·km at a wavelength of 1.55 μm is carried out without any fault of transferred information codes.

Figure 5:
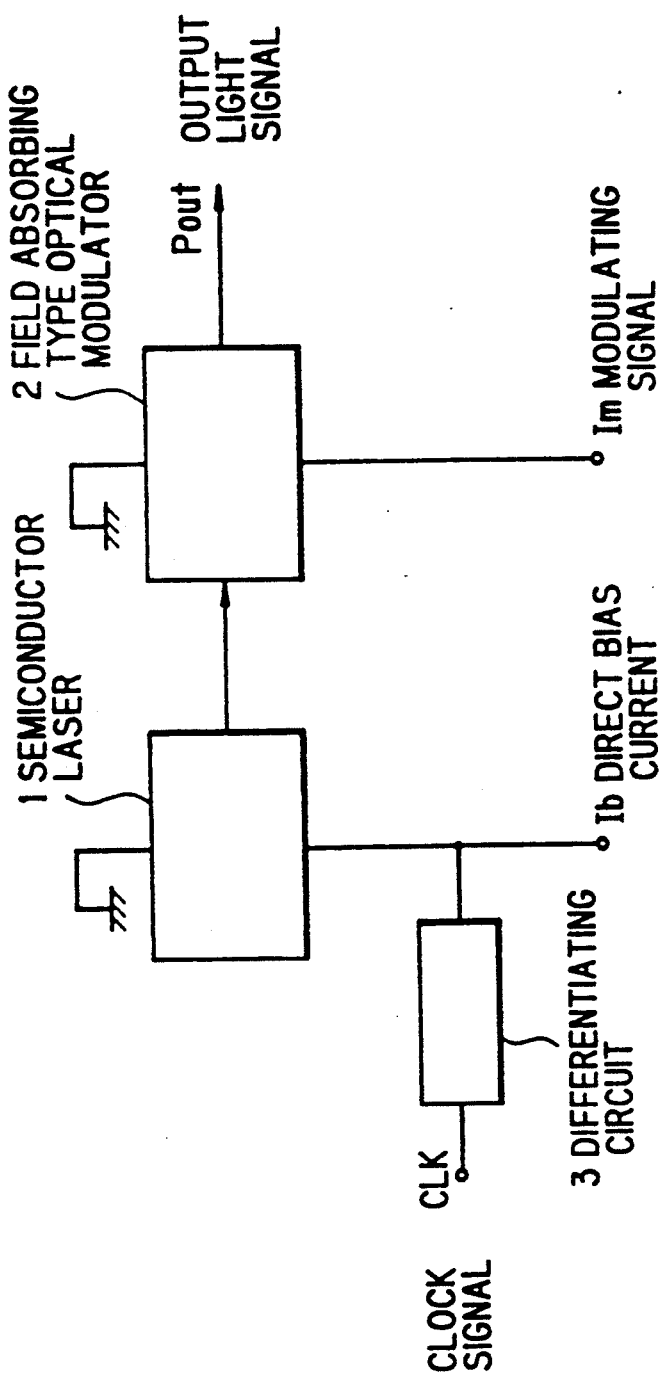
FIG. 5 is a block diagram of an optical transmitter in a third preferred embodiment according to the invention.

FIG. 5 is a block diagram of an optical transmitter in a third preferred embodiment according to the invention.

The optical transmitter comprises a semiconductor laser 1 which generates a laser light in accordance with a direct bias current Ib, and electroabsorption type optical modulator 2 to modulate an intensity of the light supplied form the semiconductor laser 1 in accordance with a modulating signal Im, and a differentiating circuit 3 which supplies the semiconductor laser 1 with a differentiated signal of a clock signal CLK. In this preferred embodiment, any circuit having a function of generating a differentiated signal of the clock signal CLK can be used in a differentiating circuit 3. For instance, the differentiating circuit 3 may be a phase shift circuit in a case that the clock signal CLK is a sine wave.

In operation, the differentiating circuit 3 supplied a differentiated signal of the clock signal CLK to the semiconductor laser 1 in addition to a direct bias current Ib to generate a laser light signal having a compensating wavelength in accordance with a frequency of the clock signal CLK. On the other hand, the modulating signal Im which is a RZ code signal is supplied to the optical modulator 2 to modulate an intensity of the light signal supplied from the semiconductor laser 1. In this case, the differentiating circuit 3 supplies the differentiated signal by adjusting a time constant to change the wavelength of the light signal to cancel the wavelength change of the light signal during the modulation in the optical modulator 2 to minimize extension of the wavelength spectrum of the output light signal Pout. As the modulating signal Im is a RZ code signal, when the modulating signal Im is zero, the optical output Pout becomes also zero, so that the output light signal Pout is not affected by the wavelength change of the light signal supplied from the semiconductor laser 1.

In an optical transmission experiment using the optical transmitter in the third preferred embodiment which is carried out under a condition that a wavelength of a light signal is 1.5 μm and a transmission velocity is 4.8 Gb/s, it is confirmed that the extension of the wavelength spectrum of the modulated light signal becomes one fifth as narrow as that in the conventional method or apparatus, and an allowable dispersion of the light signal during transmission by an optical fiber becomes 2000 ps/nm. As a result, an optical transmission in a distance of 120 km using an optical fiber having a characteristic of the wavelength dispersion which is 17 ps/nm·km at a wavelength of 1.55 μm is realized with excellent transmission characteristics.

Although the invention has been described with respect to specific embodiment for complete and clear disclosure, the appended claims are not so limited and alternative constructions that may occur to one skilled in the art which fairly fall within the basic teaching herein set forth. For instance, any optical modulator is applied int eh invention as well as an electroabsorption type optical modulator and a Mach-Zender optical modulator, as for as the optical modulator is that the wavelength change during the intensity modulation can be indicated as a differentiated signal of the modulation signal. Furthermore, the operation of differentiation in the differentiating circuit can be conducted by adjusting a polarity, a time constant, etc., in accordance with types of optical modulators used in an optical transmission and a transmission velocity of information.

What is claimed is:

1. A method of optical transmission, comprising the steps of:

emitting a light from a light source;

modulating an intensity of said light supplied form said light source to generate an output light signal in accordance with a modulating signal;

controlling a wavelength of said light by adding a correction signal to an electric bias of said light source such that said wavelength of said light supplied from said light source is adjusted to compensate for and cancel a wavelength change which occurs in said output light signal during said modulating step; and generating said correcting signal in response to level changes in said modulating signal.

2. A method of optical transmission, according to claim 1, wherein:

said emitting step is a step of emitting said light from a semiconductor laser.

3. A method of optical transmission, according to claim 1, wherein:

said modulating step is a step of modulating said intensity of said light signal dependent on an optical absorption coefficient which is changed by applying an electric field in accordance with said modulating signal.

4. A method of optical transmission, according to claim 1, wherein:

said modulating step is a step of modulating said intensity of said light dependent on an optical length of optical waveguides which is changed by applying an electric field in accordance with said modulating signal.

5. A method of optical transmission, according to claim 1, wherein:

said correcting signal is a differentiated signal of said modulating signal.

6. A method of optical transmission, according to claim 1, wherein:

said correcting signal is a differentiated signal of a clock signal.

7. A method of optical transmission, according to claim 1, wherein:

said correcting signal is a differentiated signal of a clock signal, and said modulating signal is a RZ code signal.

8. A method of optical transmission, according to claim 5, further comprising a step of:

generating a delayed signal of said modulating signal;

wherein said modulating of said intensity of said light signal is carried out in accordance with said delayed signal, so that a wavelength change of said light signal coincides with said wavelength change which occurs during said modulating step.

9. An optical transmitter, comprising:

a light source which generates a light having a predetermined wavelength;

an optical modulator which modulates an intensity of said light supplied form said light source to generate an output light signal in accordance with a modulating signal;

means, coupled to said light source, for controlling a wavelength of said light generated by said light source in accordance with a correcting signal such that said wavelength of said light supplied from said light source is adjusted to compensate for and cancel a wavelength change which occurs in said output light signal during modulation by said optical modulator; and a correcting signal generation means which generates said correcting signal by detecting level changes of said modulation signal.

10. An optical transmitter, according to claim 9, wherein:

said light source is a semiconductor laser which generates a laser light.

11. An optical transmitter, according to claim 9, wherein:

said optical modulator is an optical modulator selected from one of an electroabsorption type optical modulator and a Mach-Zender type optical modulator.

12. An optical transmitter, according to claim 9, wherein:

said producing means includes means for generating a differentiated signal of said modulating signal for supplying to said light source.

13. An optical transmitter, according to claim 9, further comprising:

means for generating a delayed signal of said modulating signal for supplying to said optical modulator;

wherein said optical modulator modulates said intensity of said light signal in accordance with said delayed modulating signal, so that said wavelength change of said light signal coincides with the wavelength change which occurs during intensity modulation.

14. An optical transmitter, according to claim 9, wherein:

said producing means includes means for generating a differentiated signal of a clock signal for supplying to said light source.

15. An optical transmitter according to claim 9, wherein said correcting signal produced by said producing means inversely corresponds to said wavelength change.

16. An optical transmitter according to claim 13, wherein said correcting signal produced by said producing means inversely corresponds to said wavelength change.

17. A method of optical transmission according to claim 1, wherein said correcting signal produced by said producing step inversely corresponds to said wavelength change.

* * * * *

UNITED STATES PATENT AND TRADEMARK OFFICE
CERTIFICATE OF CORRECTION

PATENT NO. : 5,325,225
DATED : June 28, 1994
INVENTOR(S) : SUZAKI et al.

It is certified that error appears in the above-identified patent and that said Letters Patent is hereby corrected as shown below:

Column 1, line 50, change "absorptionlayer" to --absorption layer--.

Column 3, line 13, change "portion" to --operation--;
　　　　　line 56, change "int eh" to --in the--;
　　　　　line 68, change "carrie dot" to --carried out--.

Column 4, line 7, change "a n" to --an--;
　　　　　line 23, change "tot he" to --to the--;
　　　　　line 61, change "t" to --to--;
　　　　　line 67, change "sot hat" to --so that--.

Column 5, line 4, change "int eh" to --in the--.

UNITED STATES PATENT AND TRADEMARK OFFICE
CERTIFICATE OF CORRECTION

PATENT NO. : 5,325,225
DATED : June 28, 1994
INVENTOR(S) : SUZAKI et al.

It is certified that error appears in the above-indentified patent and that said Letters Patent is hereby corrected as shown below:

Column 6, line 9, change "int eh" to --in the--;
        line 11, change "for" to --far--;
        line 23, change "form" to --from--.

Signed and Sealed this

Fourth Day of October, 1994

Attest:

BRUCE LEHMAN

*Attesting Officer*     *Commissioner of Patents and Trademarks*